United States Patent [19]

Lin et al.

[11] 4,112,223

[45] Sep. 5, 1978

[54] REMOVAL OF TRACE HEAVY METAL CONTAMINANTS FROM ALGAE AND THE CARRAGEENAN CONTAINED THEREIN

[75] Inventors: Chii-Fa Lin, Tarrytown, N.Y.; Julian E. Blanch, Stamford, Conn.

[73] Assignee: Stauffer Chemical Company, Westport, Conn.

[21] Appl. No.: 735,461

[22] Filed: Oct. 26, 1976

Related U.S. Application Data

[63] Continuation of Ser. No. 538,624, Jan. 6, 1975, abandoned.

[51] Int. Cl.$^2$ ............................................. C08B 37/04
[52] U.S. Cl. ..................................... 536/114; 426/431
[58] Field of Search ............... 426/271, 575, 425, 431; 536/1, 3, 114, 122

[56] References Cited

U.S. PATENT DOCUMENTS

| 2,624,727 | 1/1953 | Le Gloahec | 536/1 |
| 3,176,003 | 3/1965 | Stancioff | 426/575 X |

*Primary Examiner*—Robert A. Yoncoskie
*Attorney, Agent, or Firm*—Richard P. Fennelly

[57] ABSTRACT

Heavy metal contaminants which are normally present in trace amounts are removed from those algae of the genera Gigartina and Iridaea which contain a major amount of lambda type or non-gel-forming carrageenan and from the carrageenan itself by soaking the algae in a solution containing a water-soluble potassium salt which does not cause appreciable extraction of the carrageenan from the algae.

9 Claims, No Drawings

REMOVAL OF TRACE HEAVY METAL CONTAMINANTS FROM ALGAE AND THE CARRAGEENAN CONTAINED THEREIN

This is a continuation of application Ser. No. 538,624 filed Jan. 6, 1975, now abandoned.

TECHNICAL DESCRIPTION OF THE INVENTION

Although treating of algae has been proposed using certain salt solutions, Marshall et al. *Investigations in Britain,* "British Seaweeds and the Preparation of Agar" pp. 71–75 (1949) and U.S. Pat. Nos. 3,176,003, 2,620,335 and 2,624,727, either to remove readily diffusible salts that are physically entrapped in algae, to selectively extract carrageenan from the algae or to treat algae containing predominant amounts of gel-forming, or kappa type, carrageenan, it has not been recognized that potassium salt containing solutions can be used under certain reaction conditions to materially reduce the level of trace heavy metal contaminants which are contained in algae having a major amount of lambda-type carrageenan therein without at the same time causing swelling of the algae and consequent extraction of the carrageenan from the algae. Removal of these trace contaminants yields a carrageenan product having a lower level of trace heavy metal contaminants, such as arsenic, which cannot be present at more than 3.0 ppm in food grade carrageenan by governmental regulation. Such a process, as will be described in greater detail below, therefore yields a more pure grade lambda-type carrageenan which is useful in food products as an emulsifier, stabilizer and thickener.

The algae which are to be treated in the process of the present invention comprise those algae in the genera Gigartina and Iridaea which contain major amounts of lambda-type carrageenan. The term "major amount" as used herein is meant to include all those which have a content of lambda-type or non-gel-forming carrageenan which is greater than about 50% by weight of the total carrageenan content of the algae. The preferred genus is Gigartina, and the species of most interest are *Gigartina acicularis* and *Gigartina pistillata*.

The potassium salt containing solution that is used to treat the algae is one which is preferably a food grade solution containing an effective amount of potassium ion to reduce the level of trace heavy metal contaminants, e.g., arsenic, the metal of most concern, copper, zinc, mercury, cadmium, lead and the like, at the particular reaction conditions described below, without at the same time causing any appreciable extraction of the carrageenan contained in the algae. Any appreciable extraction of carrageenan is easily detected by reacting the potassium salt containing solution after the algae has been treated or soaked therein with an alcoholic reagent, e.g., full strength isopropyl alcohol, at a volume ratio of about 2:1. If any appreciable amount of carrageenan has been extracted, the presence of a fibrous precipitate will be immediately noted. Such soluble potassium salts as potassium chloride, tripotassium orthophosphate, monohydrogen dipotassium orthophosphate, and tetrapotassium pyrophosphate are the preferred salts. The most preferred is potassium chloride. The amount of potassium salt that is used should be sufficient to give a concentration of potassium ion which will range between about 0.1 and about 4 moles/liter, preferably between about 0.6 and about 3 moles/liter, and the amount should be correlated to the temperature of the soaking step as will be described in greater detail below. The pH of the soaking solution will preferably range between about 6 and 10 preferably around 7.

The actual mechanical step of treating the algae is preferably carried out by soaking the algae in the solution for about 10 min. to 2 hours, preferably about 30 min. to about 1 hour, in either a single soak or in multiple soak steps. The weight ratio of solution to algae should be greater than 7:1, preferably about 10:1. If desired, the soaking solution can be used more than once to wash fresh batches of unwashed algae with about 7 to 10 such repeat soakings being the general upper limit for acceptable removal of trace contaminants.

It is important to the success of the present process that the temperature of the soaking step be correlated to the concentration of potassium ion in the solution in order to avoid extraction of the normally potassium salt extractable lambda-type carrageenan as is described and intended in U.S. Pat. No. 3,170,003. For potassium ion concentrations below 1.0 mole $K^+$/liter of solution, the temperature should range between just above the freezing point of the solution, which varies in a known manner with the concentration of solute, to not in excess of about 10° C., preferably not above 7° C. When the potassium ion concentration is above 1.0 mole $K^+$/liter of solution, the temperature should range between just above the freezing point of the solution and about 25° C. Some preferred amounts of potassium ion to use at certain temperatures are: 0.5 to 1.0 mole/liter (4–7.5% by weight) at about 5° C.; about 1.0 to about 1.4 moles/liter (7.5–10% by weight) at about 10° C.; about 1.4 to about 1.7 moles/liter (10–12% by weight) at about 17° C.; and about 1.7 to 2.2 moles/liter (12–15% by weight) at about 25° C.

The following Examples set forth certain embodiments of the invention for illustration of the process:

EXAMPLE 1

Five grams of comminuted seaweed, *Gigartina acicularis*, having an arsenic content of about 12.1 ppm, which had been mechanically dried to about 20–40% moisture content, were soaked in 100 ml. of various salt solutions at room temperature (23° C.). After 30 minutes the solutions were separated from the seaweed. The seaweed was then placed in a fresh salt solution for a second soaking for the same amount of time. The arsenic content of the salt solutions after each soaking and of the washed seaweed after the second soaking was measured. Table 1 sets forth the results:

Table 1

| Soaking Solution | | Solution Recovered (%) | Total Arsenic Extracted (%) | Arsenic Left in Seaweed (ppm) |
|---|---|---|---|---|
| 3M KCl | First Soak | 85 | 78.7 | |
|  | Second Soak | 98 | 11.4 | 1.2 |
| 3M NaCl | First Soak | 61 | 56.5 | |
|  | Second Soak | 97 | 13.6 | 3.6 |
| 3M NH$_4$Cl | First Soak | 63 | 57.4 | |
|  | Second Soak | 96 | 15.9 | 3.2 |
| 1.5M CaCl$_2$ | First Soak | 79 | 50.9 | |
|  | Second Soak | 88 | 9.6 | 4.8 |
| 1.0M K$_3$PO$_4$ | First Soak | 89 | 64.6 | |
|  | Second Soak | 94 | 13.2 | 2.7 |
| 0.75M K$_4$P$_2$O$_7$ | First Soak | 90 | 75.4 | |
|  | Second Soak | 97 | 11.6 | |

Table 1-continued

| | Soaking Solution | Solution Recovered (%) | Total Arsenic Extracted (%) | Arsenic Left in Seaweed (ppm) |
|---|---|---|---|---|
| 1.5M K₂HPO₄ | First Soak | 91 | 69.8 | 1.6 |
| | Second Soak | 97 | 14.2 | 1.9 |

The above data demonstrate that the potassium chloride solution is the most efficient solution in reducing the arsenic content of *Gigartina acicularis* and in preventing swelling of the seaweed as reflected in the high amount of solution recovered after the soaking step.

EXAMPLE 2

A number of potassium chloride solutions having differing solute levels were tested as described in Example 1. Table 2 sets forth the results:

Table 2

| Weight Concentration of KCl | Solution Recovered (%) | Total Arsenic Extracted (%) | Arsenic Left in Seaweed (ppm) |
|---|---|---|---|
| 5% (0.69M) First Soak | 67 | 54.1 | |
| Second Soak | 98 | 14.2 | 3.8 |
| 10% (1.43M) First Soak | 79 | 80.3 | |
| Second Soak | 94 | 14.4 | 0.7 |
| 15% (2.21M) First Soak | 84 | 82.0 | |
| Second Soak | 96 | 12.1 | 0.7 |
| 20% (3.04M) First Soak | 87 | 87.1 | |
| Second Soak | 96 | 8.7 | 0.4 |

The data demonstrate that about 10% KCl or greater is needed to reduce the arsenic content in seaweed below about 1 ppm at room temperature.

EXAMPLE 3

The soaking procedure of Example 1 was used with the exceptions that 7 grams of *Gigartina acicularis* in 100 ml. of water and a soaking time of 60 minutes were used. Potassium chloride solutions of varying strength were used. Table 3 sets forth the results:

Table 3

| Concentration of KCl | (%) Solution Recovered | (%) Total Arsenic Extracted | Arsenic Left in Seaweed (ppm) |
|---|---|---|---|
| 10% (1.43M) First Soak | 71 | 52.8 | |
| Second Soak | 94 | 21.6 | 3.1 |
| 15% (2.21M) First Soak | 77 | 74.5 | |
| Second Soak | 100 | 18.3 | 0.9 |
| 20% (3.04M) First Soak | 80 | 73.7 | |
| Second Soak | 99 | 17.5 | 1.1 |

EXAMPLE 4

The effect that soaking of 270 kg of *G. acicularis* with 1600 gal. of potassium chloride solution at 6% by weight (0.835M) strength at 2°-7° C. (36°-44° F.) for 30 minutes has on the arsenic content, yield and chocolate milk viscosity of lambda carrageenan is shown in Table 4:

Table 4

| Run | KCl Soaking | Arsenic Content of Carrageenan | Yield* | Chocolate Milk Viscosity** |
|---|---|---|---|---|
| 1A | Yes | 2.0 ppm | 43% | 31.3 Seconds |
| 1B | No | 5.1 ppm | 35% | 33.0 Seconds |
| 2A | Yes | 1.9 ppm | 42.4% | 30.6 Seconds |
| 2B | No | 4.1 ppm | 39.1% | 29.5 Seconds |

*weight amount of carrageenan divided by the weight of the seaweed.
**time needed for 44 ml. of chocolate milk containing 280 ppm of carrageenan to fall through an orifice 0.094 in. in diameter. Higher values indicate a more viscous milk product.

EXAMPLE 5

Fifty grams of *Gigartina acicularis* was soaked in 1000 ml. of a 6% by weight potassium chloride solution for 30 min. at 5° C. It was removed and soaked again in a fresh potassium chloride solution for another 30 minutes at 5° C. Table 5 below sets forth the amounts of various heavy metal cations (in parts per billion) originally present in the KCl solutions and present after each wash:

Table 5

| | Cation Concentration, ppb | | |
|---|---|---|---|
| Cation | Originally in KCl Solution* | Present in 1st Soak Solution** | Present in 2nd Soak Solution*** |
| $Cu^{++}$ | 456 | 492 | 469 |
| $Zn^{++}$ | 205 | 271 | 258 |
| As | <9 | 418 | 45 |
| Hg | 0.068 | 0.098 | 0.141 |

*1000 ml. was used.
**910 ml. was recovered after first soak.
***980 ml. was recovered after second soak.

EXAMPLE 6

A series of experiments similar to those described in Example 1 were undertaken using a soak temperature of 5° C. The results are:

Table 6

| | Soaking Solution | Solution Recovered (%) | Total Arsenic Extracted (%) | Arsenic Left in Seaweed (ppm) |
|---|---|---|---|---|
| 4% KCl (0.55M) | First Soak | 73 | 69.4 | |
| | Second Soak | 93 | 14.5 | 1.9 |
| 5% KCl (0.69M) | First Soak | 81 | 79.0 | |
| | Second Soak | 96 | 13.7 | 0.9 |
| 6% KCl (0.84M) | First Soak | 83 | 79.2 | |
| | Second Soak | 95 | 11.9 | 1.1 |
| 8% KCl (1.13M) | First Soak | 86 | 85.8 | |
| | Second Soak | 99 | 10.4 | 0.5 |

The above Examples illustrate certain embodiments of the invention. The scope of protection that is desired is set forth in the appended claims.

What is claimed:

1. A process for removing trace heavy metal contaminants from algae that contain a major amount of lambda-type carrageenan and from said carrageenan which comprises treating said algae with a water solution containing an effective amount of a soluble food grade potassium salt for removal of said trace heavy metal contaminants using a concentration of potassium ion in the solution which is below 1.0 mole $K^+$/liter and at a temperature not in excess of about 10° C. such that there is no appreciable extraction of the lambda-type carrageenan from the algae.

2. A process as claimed in claim 1 wherein the algae is selected from the genus Gigartina.

3. A process as claimed in claim 1 wherein the algae are selected from the group consisting of *Gigartina acicularis* and *Gigartina pistillata*.

4. A process as claimed in claim 1 wherein the soluble potassium salt is selected from the group consisting of potassium chloride, tripotassium orthophosphate, monohydrogen dipotassium orthophosphate, and tetrapotassium pyrophosphate.

5. A process as claimed in claim 1 wherein the weight ratio of potassium solution to algae is greater than about 7:1.

6. A process as claimed in claim 1 wherein the potassium salt is potassium chloride.

7. A process as claimed in claim 1 wherein the algae are washed with the solution for a period of time ranging from about 10 minutes to 2 hours.

8. A process as claimed in claim 1 wherein the contaminant which is removed is arsenic.

9. A process as claimed in claim 1 wherein the algae is selected from the genus Iridaea.

* * * * *

UNITED STATES PATENT AND TRADEMARK OFFICE
CERTIFICATE OF CORRECTION

PATENT NO. : 4,112,223

DATED : September 5, 1978

INVENTOR(S) : Chii-Fa Lin et al.

It is certified that error appears in the above–identified patent and that said Letters Patent are hereby corrected as shown below:

Col. 2, line 21, "3,170,003" should be -- 3,176,003 --.

Signed and Sealed this

Tenth Day of April 1979

[SEAL]

Attest:

RUTH C. MASON
*Attesting Officer*

DONALD W. BANNER
*Commissioner of Patents and Trademarks*